Figure 1:
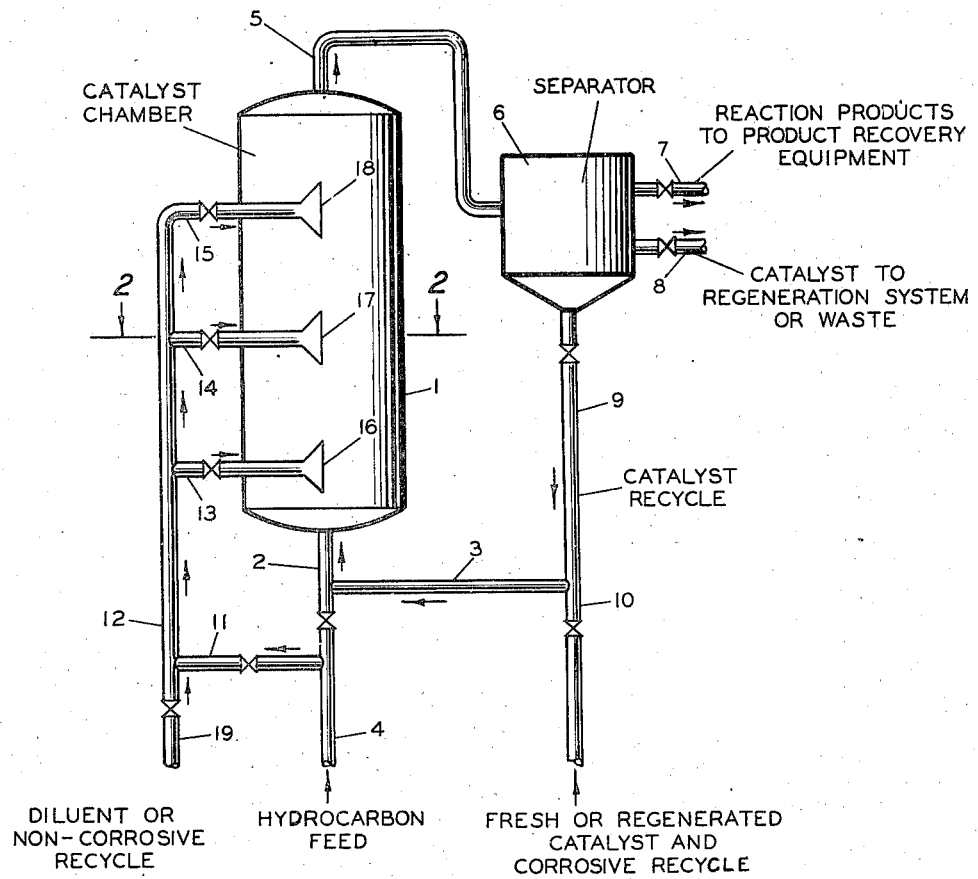

April 24, 1945.  I. L. WOLK ET AL  2,374,518

CATALYTIC PROCESS

Filed April 9, 1943

I.L. WOLK
T.H. WHALEY
INVENTORS

BY
ATTORNEYS

Patented Apr. 24, 1945

2,374,518

UNITED STATES PATENT OFFICE 2,374,518

CATALYTIC PROCESS

I. Louis Wolk and Thomas H. Whaley, Bartlesville, Okla., assignors to Phillips Petroleum Company, a corporation of Delaware Application April 9, 1943, Serial No. 482,476

11 Claims. (Cl. 196—52)

The present invention relates to a method for carrying out catalytic reactions. The method of this invention is particularly applicable to catalytic conversions in which catalysts having a corrosive or erosive action are employed. In catalytic conversions utilizing liquid, solid or gaseous catalysts in which the catalysts are suspended, dispersed or dissolved in reactant fluids, the catalysts utilized frequently cause corrosive and/or erosive effects due to either chemical or physical properties of the catalyst or both, emphasized by the fluent conditions of use. These factors are influenced by others such as stream velocities, operating temperatures and the like. The corrosive and erosive effects are particularly noticeable in the presence of solid suspended catalyst, whether utilized in gaseous or liquid phase reactants, and especially so where the catalyst itself, the reactants, promoters, and/or products of reaction, have a tendency to chemically attack walls of reaction vessels and other equipment.

In one specific embodiment, the present invention relates to prevention or decrease of the erosive and corrosive effects of catalysts in such reactions as isomerization and alkylation, particularly when catalysts such as aluminum chloride, hydrogen fluoride, or boron trifluoride, with or without promoters such as hydrogen chloride, are utilized. In reactions using a solid catalyst such as aluminum chloride, in the form of sludge or suspension, the erosive effect of this material, particularly in the presence of hydrogen halides, has a highly destructive effect on the interior walls of reaction vessels. Even in the absence of solid material, corrosive effects occur and these are influenced by currents or streams of material being treated as well as by the inherently corrosive nature of the catalytic materials.

The present invention relates further to catalytic conversions utilizing suspended finely divided solid catalyst, such conversions being typified by the process known as fluid catalytic cracking, in which a hydrocarbon vapor carrying suspended catalyst is flowed through a conversion zone at cracking temperatures, say 800° F. to 1150° F., catalyst separated from products, and the catalyst regenerated by suspension in regenerating gas and passage through a regeneration zone. In conventional practice, a certain amount of erosion occurs in both the regeneration and the reaction zones.

In addition to the foregoing purposes and objects of the present invention, the manner in which said purposes and objects are accomplished at the same time results in improved circulation and contact of reactants with catalyst, as well as providing a mode of operation which will permit control of reaction temperatures while accomplishing the foregoing results.

In accordance with the present invention, the above-mentioned problems may be mitigated or avoided by the provision of means for introducing noncorrosive fluids into the reaction zone tangenetially in a manner which will provide a film or zone of little or no catalyst content adjacent the inner walls of the reaction chamber, thus preventing or restraining contact of erosive or corrosive material with chamber walls. Preferably this is accomplished by introducing the fluid at one or more points spaced in the direction of flow of reactants or in a single longitudinal film. In order to avoid dilution of products or introduction of extraneous material, the fluid so introduced may constitute all or a portion of the feed or may consist of or include recycle material separated from the reaction products. Fluid which is relatively non-reactive in the reaction being carried out may also be utilized. In some cases it may be desirable to introduce tangential fluid which is of a gaseous character, either for liquid phase or gas phase reactions, and preferably this gaseous fluid may possess a definite function in the process, that is it may comprise feed, diluent or heat-containing material.

Figure 2:
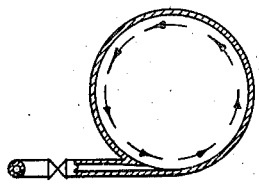

One form of apparatus which may be utilized in carrying out the process is shown in Figure 1, which is a plan view. Figure 2 represents a horizontal cross section showing the tangential introduction of fluid, taken through line 2—2 of Figure 1. This form of apparatus may be generally utilized for carrying out processes of the type described herein with modifications obvious to one skilled in the art. Other forms of apparatus applying the principles of the present invention will be readily apparent in view of the instant disclosure.

In the drawing, a suspension of catalyst, which may be a finely divided solid, carried in a body of fluid to be converted, is introduced into reaction zone 1 through conduit 2. The suspension may be formed by introducing catalyst from line 3 into a hydrocarbon feed previously heated to approximate conversion temperature and introduced through line 4. The suspension flows vertically through zone 1 under conversion conditions of temperature and pressure and the reaction products, carrying with them spent catalyst in suspension, are removed through line 5 and flow to separator 6 where reaction products are separated from catalyst and removed via line 7 to fractionation or other recovery equipment. The separator may be a cyclone separator in the case of solid catalysts suspended in gases or may be a gravity separator in the case of liquid-phase operation with solid, slurry catalysts. The separated catalyst, if necessary, is passed through pipe 8 to a regeneration zone or all or a portion thereof may be discarded if too spent for reuse. Where the catalyst may be reused without regeneration, as in the case of aluminum chloride slurry, it is returned to the system via lines 9 and 3. Fresh or regenerated catalyst is introduced via line 10. In order to counteract corrosive and/or erosive action of catalyst and other components of the reaction zone contents, a diluent for these components, or the feed, or a mixture of the two is introduced tangentially of the reaction zone along its length. This will cause the formation of a circumferential film adjacent the inner periphery of the reaction chamber, which film is relatively free from catalyst and other erosive or corrosive materials, thus serving to protect the walls of the chamber. Where the film-forming or protective material is a portion of the catalyst-free feed, this is introduced through lines 4, 11, and 12 into lines 13, 14, and 15, which in this case terminate in elongated slots 16, 17, and 18 which give a fan-shaped stream against the inner wall of the chamber. Preferably the slots are so designed that the cross-sectional area of the slot is not larger than the cross-sectional area of the conduit leading thereto, as illustrated in Figure 2 of the drawing. In place of these slots, a single elongated slot may be used to introduce the protective fluid in a single sheet. Where the protective fluid is in the form of a non-reactive fluid, this may be introduced via line 19. In any case, the film-forming material is introduced at a velocity sufficient to provide a thin diluted zone adjacent the interior wall of the catalyst chamber while avoiding excessive dilution of the charge. If desired, the points of tangential introduction of fluid may be at two or more points along the periphery of the chamber in the same plane or in different planes in order that the tangential motion of the introduced film may be made more continuous. The nozzles or slots or other means for introduction of fluid may be located at or near points wnere excessive corrosion may occur in order to ensure protection at such points.

While a primary function of the present invention is the mitigation of corrosion and/or erosion it is found that a rotary movement may be induced within the entire body of reactant fluid in the foregoing manner, the resulting fluid movement being both rotary and axial and giving more efficient conversion. The swirling action imparted to the contents of the catalyst chamber aids in obtaining intimate mixing of catalyst and reactants near the axis of the chamber. The action observed is similar to that obtained in a beaker when a swirling motion is imparted by stirring liquid, as water, in which solid particles, as sand, are immersed. The solid particles, even though heavier than the liquid, seek the relatively quieter central region. This whirling motion may be supplemented by mechanical means. At the same time, utilization of the procedure described will permit ready temperature control of the reaction. When the reaction is endothermic, for example, and the temperature tends to drop as the reactants flow through the reaction zone, the diluent may be heated to or slightly above reaction temperature. In this way a film or barrier is provided which is at or near the desired temperature, surrounding the reactants and supplying heat thereto, while at the same time preventing heat loss from the reactants to the surroundings. In the same way, heat may be abstracted from an exothermic reaction by supplying cooled diluent.

Specific modes of applying the above principles are represented by the following examples:

*Example I*

In an arrangement similar to that shown in the drawing isobutane was alkylated with butylenes, chiefly isobutylene, in the presence of substantially anhydrous hydrofluoric acid as catalyst. The alkylation temperature was in the range of 110 to 120° F. The volume ratio of hydrocarbons to hydrofluoric acid was about 4 to 1 and the mol ratio of isobutane to butenes about 12 to 1. The average contact time in the catalyst chamber was about 14 minutes. The alkylate yielded about 95% of a gasoline fraction boiling below 365° F. and having an A. S. T. M. octane number above 90.

The effluent of the catalyst chamber was split into two streams, the major portion, about 90%, of the total effluent being recycled to the chamber and entering with the catalyst, the remainder passed to the catalyst separator, and the hydrofluoric acid (heavy) phase separated and recycled to the catalyst chamber. Isobutane was separately recovered from the alkylate and recycled to the catalyst chamber. The butylenes were thoroughly mixed with the hydrofluoric acid and the recycle isobutane prior to introduction at the center of the catalyst chamber. A part of the isobutane, either fresh or recycle, was injected tangentially serving to protect the walls of the reaction vessel from the corrosive action of the acid. Considerably reduced corrosion of the catalyst chamber was observed when operating in this manner in accordance with the present invention. From about 10% to about 50% of the isobutane may be injected into the reaction chamber tangentially.

*Example II*

In an arrangement similar to that shown in the drawing normal butane is isomerized to isobutane in the presence of an aluminum chloride catalyst activated with hydrochloric acid. The isomerization is carried out in liquid phase at 300 pounds per square inch and at a temperature in the range of about 170 to about 210° F. The catalyst chamber is charged with granular solid aluminum chloride which takes up about one third to one half of the space within the catalyst chamber. Hydrogen chloride, 6 to 7 mol percent, is maintained in the catalyst chamber as activator. When in operation, the catalyst is in the form of discrete particles agitated by the flow of fluid through the catalyst chamber. Some of the aluminum chloride, especially that in the finely divided or dissolved state, is carried overhead with the hydrocarbon effluent and separated therefrom in the separator from which it may be recycled to the catalyst. Normal butane, either fresh or recycle, is supplied to the chamber at both the central point and at the points of tangential injection. Recycled catalyst is introduced at the center of the chamber, as through line 2 of the drawing. Fresh catalyst is added continuously or periodically to make up for losses. Aluminum chloride sludge is formed, but in the presence of fresh aluminum chloride is active as a catalyst. Aluminum chloride sludge carried overhead may be separated from the catalyst recycle and discarded. The sludge tends to accumulate at the bottom of the catalyst chamber and may be removed therefrom continuously or periodically. The fluidity of the sludge in the catalyst chamber is improved by the addition of particulate alumina to which the sludge adheres.

Unreacted normal butane, after separation from the isobutane in the reaction products, is recycled. The catalyst is highly corrosive and erosive. Normal butane is injected tangentially into the catalyst chamber at a plurality of points. The catalyst may be substantially suspended by the upwardly flowing butanes and maintained out of contact with the walls of the catalyst chamber by the tangential injection of the normal butane. The reaction is exothermic; it has been found possible to prevent excessive temperature rise by the control of the quantities injected at the various points along the length of the catalyst chamber. Both corrosion and erosion are considerably reduced when injecting the normal butane tangentially into the catalyst chamber at a number of rather closely spaced points along its axis.

The same procedure is used in carrying out vapor-phase isomerization at temperatures in the range of about 190 to about 220° F. and at a pressure of about 150 pounds per square inch. When operating in the vapor phase it has been found advantageous to inject liquid normal butane at a plurality of points along the axis of the catalyst chamber to control the temperature. A finely divided adsorbent material, as aluminum oxide, is advantageously used to promote fluidity of sludge formed by reaction between aluminum chloride and hydrocarbons.

*Example III*

A suspension of 200-400 mesh silica-alumina or Filtrol clay catalyst in 30° A. R. I. gas oil vapors preheated to 950° F. is introduced into the reaction zone of Figure 1. A catalyst to oil ratio of about 4 parts by weight of catalyst per weight of oil feed is utilized and the feed is conducted through the reactor at a flow rate which will give a residence time of about 5 to 50 seconds. The products of reaction containing suspended catalyst are passed to a cyclone separator where the deactivated catalyst is separated from the products. The thus-separated catalyst is introduced into a regeneration zone, which may have the same structure as the reaction zone, where the catalyst is contacted with oxygen-containing gas under combustion conditions to burn off carbon deposits. The reactivated catalyst is returned to the reaction zone. During the reaction about 10% of the feed, free from catalyst, is introduced multipoint tangentially through a plurality of slots as shown at 16, 17 and 18 in the drawing. The velocity of the tangentially introduced material is sufficiently high to provide a high concentration of catalyst-free feed adjacent the inner wall of the reactor. Substantial erosion of the inner wall of the reactor is prevented by thus decreasing the catalyst concentration adjacent thereto. At the same time, contact of the catalyst and reactants is improved due to the tangential and axial movement given to the reactants as they flow through the reaction zone. In place of hydrocarbon feed, relatively inert gases such as methane, ethane, or propane may be used to provide the diluent and circulatory effects.

In the regeneration zone, the same procedure is followed, except that the tangential feed is a minor proportion of the oxygen-containing gas or steam or the like. By using a relatively cool diluent gas in this way temperature control may be effected.

It is within the scope of this invention to feed the catalyst, or a hydrocarbon feed admixed with the catalyst, to the top of the catalytic reactor, withdrawing the reaction products and catalyst from the bottom of the chamber. It is within the scope of the invention also to employ the catalyst chamber of our invention in a horizontal position, particularly with the points of introduction of fluid through pipes 13, 14, and 15 along the lowermost half of the chamber when in the horizontal position. The fluid added through line 19 may comprise substantially non-corrosive hydrocarbon recycle separated from the reaction products, particularly unconverted feed. Corrosive recycle streams are preferably introduced into the catalyst chamber at some point within the peripheral limit of the chamber, as at its axis through pipe 2. Where large volumes of hydrocarbon feed material having corrosive properties are fed or recycled, this material is introduced through pipe 2 and the non-corrosive barrier-forming fluid is introduced through conduit 12. Other uses and modifications of the invention will be apparent to those skilled in the art.

We claim:

1. A process for the catalytic conversion of hydrocarbons which comprises vaporizing said hydrocarbons, suspending finely divided catalyst therein, flowing the resulting suspension through a conversion zone under conversion conditions, and introducing gaseous material devoid of catalyst tangentially along the path of flow of the hydrocarbon-catalyst suspension in the form of a thin film, thereby interposing a relatively catalyst-free barrier between the suspension and the walls of the conversion zone.

2. A process according to claim 1 wherein the gaseous material is a portion of the vaporized hydrocarbon feed.

3. A process according to claim 1 wherein the catalyst is a cracking catalyst and the conversion reaction is carried out under cracking conditions.

4. A process for the catalytic conversion of hydrocarbons which comprises admixing catalyst with said hydrocarbons to form a fluid mixture, flowing the resulting hydrocarbon-catalyst fluid mixture through a conversion zone under conversion conditions, and introducing non-corrosive fluid material devoid of catalyst tangentially along the path of flow of the hydrocarbon-catalyst mixture in the form of a thin film, thereby interposing a relatively catalyst-free barrier between the mixture and the walls of the conversion zone.

5. A process according to claim 4 in which the hydrocarbon to be converted is normal butane, the catalyst is aluminum chloride promoted with minor amounts of hydrogen chloride, the tangentially introduced material comprises a minor proportion of catalyst-free normal butane, and the process is conducted under conditions of temperature and pressure effecting isomerization of said normal butane to isobutane.

6. A process according to claim 1 wherein the catalyst is aluminum chloride and the conversion reaction is isomerization of n-butane to isobutane.

7. A process according to claim 4 in which the non-corrosive fluid material supplies heat to the conversion.

8. A process according to claim 4 in which the non-corrosive fluid material abstracts heat from the conversion.

9. A process for the catalytic endothermic conversion of hydrocarbons at elevated temperatures which comprises admixing catalyst with said hydrocarbons to form a fluid mixture, flowing the resulting hydrocarbon-catalyst fluid mixture through a conversion zone at elevated temperatures under endothermic conversion conditions, introducing sufficient of a sufficiently heated non-corrosive fluid material devoid of catalyst tangentially along the path of flow of the hydrocarbon-catalyst mixture in the form of a thin film to provide a relatively catalyst-free fluid barrier between the mixture and the walls of the conversion zone and to supply heat to said conversion and minimize heat loss from the conversion to the surroundings of said zone.

10. A process for the catalytic alkylation of isobutane with butylenes which comprises admixing butylenes, isobutane and substantially anhydrous hydrofluoric acid in proportions suitable for effecting said alkylation to form a reaction mixture, flowing the resulting mixture through a conversion zone under alkylation conditions, passing at least part of the total effluent of said conversion zone to a catalyst separator, separating therein a heavy hydrofluoric acid phase and recycling same for flow through said zone as part of said reaction mixture, and introducing isobutane devoid of hydrofluoric acid tangentially along the path of flow of said reaction mixture in the form of a thin film thereby interposing a relatively hydrofluoric acid-free barrier between said acid-containing reaction mixture and the walls of the conversion zone and protecting said walls from the corrosive action of the acid.

11. A process for the catalytic conversion of hydrocarbons which comprises admixing solid particulate catalyst with said hydrocarbons to form a fluid mixture, flowing the resulting hydrocarbon-catalyst fluid mixture through a conversion zone under conversion conditions, introducing sufficient of a non-corrosive fluid material devoid of catalyst tangentially along the path of flow of the hydrocarbon-catalyst mixture in the form of a thin film so as to interpose a relatively catalyst-free fluid barrier between the mixture and the walls of the conversion zone and with sufficient velocity so as to induce a rotary movement within the entire body of axially-flowing reactant fluid, thereby concentrating said catalyst in the central region of said zone and effecting intimate mixing of catalyst and reactants in said central region.

I. LOUIS WOLK.
THOMAS H. WHALEY.